US012718683B2

(12) United States Patent
Kreamer

(10) Patent No.: US 12,718,683 B2
(45) Date of Patent: Aug. 25, 2026

(54) METHODS AND SYSTEMS FOR USING MOBILE DEVICE-BASED CRASH DETECTION TO TRIGGER VEHICLE DATA COLLECTION

(71) Applicant: Cambridge Mobile Telematics Inc., Cambridge, MA (US)

(72) Inventor: William Ryan Kreamer, Melrose, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 208 days.

(21) Appl. No.: 18/542,003

(22) Filed: Dec. 15, 2023

(65) Prior Publication Data

US 2025/0201110 A1 Jun. 19, 2025

(51) Int. Cl.
*G08G 1/01* (2006.01)

(52) U.S. Cl.
CPC ......... *G08G 1/0112* (2013.01); *G08G 1/0129* (2013.01)

(58) Field of Classification Search
CPC .... G08G 1/0112; G08G 1/0129; G06Q 40/08; G07C 5/008; G07C 5/0808
See application file for complete search history.

(56) References Cited

U.S. PATENT DOCUMENTS 9,449,495 B1 * 9/2016 Call ...................... H04W 4/029
10,703,379 B1 * 7/2020 Harvey ................. B60W 40/09
11,157,973 B2 * 10/2021 Fuchs ................ G06Q 30/0283
11,954,315 B1 * 4/2024 Megyese ................. G06F 30/15
12,229,316 B1 * 2/2025 Craig ..................... G06Q 40/08
(Continued)

FOREIGN PATENT DOCUMENTS

EP 3744601 B1 4/2024
EP 3507787 B1 8/2024
(Continued)

OTHER PUBLICATIONS

WreckWatch: Automatic Traffic Accident Detection and Notification with Smartphones (Year: 2011).*
(Continued)

*Primary Examiner* — Fadey S. Jabr
*Assistant Examiner* — Faris Asim Shaikh
(74) *Attorney, Agent, or Firm* — Kilpatrick Townsend & Stockton LLP

(57) ABSTRACT

Techniques are disclosed for selectively collecting vehicle sensor data in response to a vehicle crash detection, which can conserve computing resources. A backend server system can perform the techniques to evaluate the severity of a potential crash or for another purpose. As one example, the backend server system can receive an indication of a potential crash of a vehicle from a user device executing a first model. In response, the backend server system can transmit a request for vehicle sensor data to a third-party server. The backend server system can receive the vehicle sensor data from the third party server. The vehicle sensor data can be obtained from the vehicle for a time range preceding the potential crash, thereby conserving computing resources. The backend server system can then determine a severity of the potential crash by executing a second model on the vehicle sensor data.

20 Claims, 7 Drawing Sheets

(56) References Cited

U.S. PATENT DOCUMENTS

| | | | | |
|---|---|---|---|---|
| 2008/0306996 | A1* | 12/2008 | McClellan | G06Q 10/06 |
| 2016/0094964 | A1* | 3/2016 | Barfield, Jr. | H04W 4/90<br>340/870.07 |
| 2017/0214760 | A1* | 7/2017 | Lee | H04L 67/563 |
| 2017/0330284 | A1* | 11/2017 | Tofte | G06Q 40/08 |
| 2018/0268305 | A1* | 9/2018 | Dhondse | G06N 5/04 |
| 2019/0354838 | A1* | 11/2019 | Zhang | G07C 5/085 |
| 2020/0334928 | A1 | 10/2020 | Bourke et al. | |
| 2021/0295441 | A1* | 9/2021 | Mullen | G08G 1/0112 |
| 2022/0108291 | A1 | 4/2022 | Cain et al. | |
| 2022/0212618 | A1* | 7/2022 | Nie | B60R 21/0132 |
| 2022/0292974 | A1* | 9/2022 | Qi | G08G 1/012 |
| 2023/0005372 | A1* | 1/2023 | Lindberg | G01C 21/3415 |
| 2023/0269504 | A1* | 8/2023 | Jenkins | G01S 19/42<br>701/32.2 |
| 2023/0298410 | A1 | 9/2023 | Calmer et al. | |
| 2024/0075895 | A1* | 3/2024 | Majjigi | B60R 21/0132 |
| 2024/0119535 | A1* | 4/2024 | Kloeppel | G06Q 30/0201 |
| 2024/0242593 | A1* | 7/2024 | Yamazaki | G08B 25/10 |

FOREIGN PATENT DOCUMENTS

| | | | |
|---|---|---|---|
| EP | 4005252 | B1 | 1/2025 |
| EP | 3588373 | B1 | 6/2025 |
| GB | 2605741 | A | 10/2022 |
| WO | 2022192579 | A1 | 9/2022 |

OTHER PUBLICATIONS

EP24219952.9, “Extended European Search Report”, May 21, 2025, 15 pages.

* cited by examiner

METHODS AND SYSTEMS FOR USING MOBILE DEVICE-BASED CRASH DETECTION TO TRIGGER VEHICLE DATA COLLECTION

BACKGROUND OF THE INVENTION

Modern vehicles include substantial computing resources and capabilities similar to many other smart devices, including the ability to communicate with smart phones, cloud computing servers, and other computing devices over a variety of networks. Modern vehicles are also equipped with numerous sensors providing voluminous data that can be used, not only for the vehicle's operation, but for related tasks like assisting vehicle navigation, monitoring the vehicle's performance over time, and providing remote control of the vehicle. Moreover, the vehicle data can be shared with associated smart devices and cloud services to enable data analysis that supports these related tasks. These processes can involve the transmission of significant amounts of vehicle data among computing devices.

Despite the progress made in the area of vehicular communications, there is a need in the art for improved methods and systems for transmitting vehicle data between computing devices.

SUMMARY OF THE INVENTION

Embodiments of the present invention relate to methods and systems for reducing the consumption of computing resources (e.g., bandwidth, memory, and processing power) by a backend server system by using a crash detection to trigger the collection of vehicle sensor data by the backend server system. For example, the backend server system can be in communication with a user device (e.g., mobile phone, laptop computer, tablet, smart watch, etc.) of a driver in a vehicle. The user device can execute a crash detection model configured to perform crash detection based on sensor data collected by its built-in sensors, for example to detect a crash event during a trip in the vehicle. In response to detecting such a crash event, the user device can notify the backend server system of the detected crash event. The user device may also transmit the sensor data to the backend server system. In response to receiving the notification, the backend server system can communicate with a third-party server system to acquire vehicle sensor data, which can include any sensor data collected by the vehicle during the trip using the vehicle's built-in sensors. In some examples, the third-party server system may be associated with a manufacturer of the vehicle and be configured to receive the vehicle sensor data from the vehicle over the course of the trip. After obtaining the vehicle sensor data, the backend server system can then analyze the user device's sensor data and/or the vehicle sensor data for various purposes, for example to confirm the crash or determine its severity. By using these techniques, the backend server system may only retrieve vehicle sensor data in response to a preliminary crash detection by the user device, for example rather than retrieving the vehicle sensor data periodically or continuously in real time over the course of the trip. This can reduce the frequency with which the backend server system retrieves vehicle sensor data, and the amount of vehicle sensor data that is retrieved by the backend server system, which can significantly reduce the network bandwidth consumption and the consumption of other computing resources (e.g., memory and processing power) by the backend server system.

As noted above, some embodiments described herein can detect a potential crash event for a vehicle, verify the crash event, and in response to verifying the crash event, trigger the collection of vehicle sensor data to evaluate the crash event in greater detail, including whether the detected event was actually a crash and its severity. Because vehicle sensor data can be generated in great quantities during the vehicle's operation, continuously transmitting and storing all of the vehicle sensor data to devices that perform the crash detection and crash evaluation can be computationally expensive and wasteful of computational and networking resources. Accordingly, techniques of the present disclosure reduce the amount of vehicle sensor data that is collected and its rate of collection by using an intelligent process that relies on a preliminary crash detection by a user device in the vehicle to trigger the collection of vehicle sensor data and control the amount of vehicle sensor data that is collected.

One embodiment is directed to a method that can be performed by a backend server system. The method can include receiving an indication of a potential crash of a vehicle. The indication can be received from a user device executing a first model. The indication may be generated by the user device based on an analysis of sensor data using the first model. The method can also include transmitting a request for vehicle sensor data to a third-party server system. The request may be transmitted in response to the indication. The method can also include receiving the vehicle sensor data from the third-party server system. The method can also include determining a severity of the potential crash based at least in part on the vehicle sensor data. The severity of the potential crash can be determined using a second model at the backend server system.

Another embodiment is directed to a system that can include a processor and a memory storing instructions that, when executed by the processor, cause the system to receive crash event data for a vehicle. The system can receive the crash event data from a user device. The crash event data can include a time of a crash event and user device sensor data. The system can also transmit a request for vehicle sensor data to a remote system. The request may be transmitted in response to receiving the crash event data and may include a time range preceding the time of the crash event. The vehicle sensor data can correspond to the vehicle. The system can also receive the vehicle sensor data from the remote system and provide the crash event data and the vehicle sensor data as input to a model. The system can also determine, using the model, a severity of the crash event.

Still another embodiment is directed to a user device. The user device can include a device sensor, a processor, and a memory storing instructions that, when executed by the processor, cause the user device to detect a crash event indicating a potential crash of a vehicle. The user device can use sensor data from the device sensor and a model to detect the crash event. In response to detecting the crash event, the user device can also transmit an indication of the crash event and the sensor data to a backend server system. The backend server system can be configured to transmit a request for vehicle sensor data to a third-party server in response to receiving the indication and the sensor data from the user device. The vehicle sensor data can correspond to the vehicle, and the request can include a time range preceding a time of the crash event. The backend server system can be further configured to receive the vehicle sensor data associated with the time range from the third-party server and determine a severity of the crash event based on the sensor data from the device sensor and the vehicle sensor data.

Numerous benefits are achieved by way of the present invention over conventional techniques. For example, embodiments of the present invention provide methods and systems that utilize a crash detection model on a user device to trigger the selective acquisition of vehicle sensor data for processing by a backend server system (e.g., a backend cloud system). Because vehicle sensors and user device sensors can continuously generate data, it may take significant computing resources to receive, store, manage, and process all such data. However, by only collecting vehicle sensor data within a predefined time window related to a crash event, in response to detecting a crash event using a user device in the vehicle, the backend server system can focus on the vehicle sensor data that is most pertinent to evaluating a crash event, particularly data near to the time of the crash event. This can allow the backend server system to consume considerably fewer computing resources than with alternative approaches, such as continuous streaming of vehicle sensor data to the backend server system. Moreover, crash events may damage or, due to their location, inhibit the network connectivity of a vehicle. Thus, the ability to manage and transmit smaller quantities of data allows for the complete transfer of pertinent data for crash evaluation even in cases where network connectivity is limited. In some instances, a user device present with the vehicle can obtain vehicle sensor data and relay that data to a cloud device or other backend server. The user device may have a better connection over a cellular network to transmit data, and may be able to communicate with the vehicle over a different network connection to obtain the vehicle sensor data.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete, and will fully convey the full scope to those skilled in the art.

DETAILED DESCRIPTION OF SPECIFIC EMBODIMENTS

Figure 1:
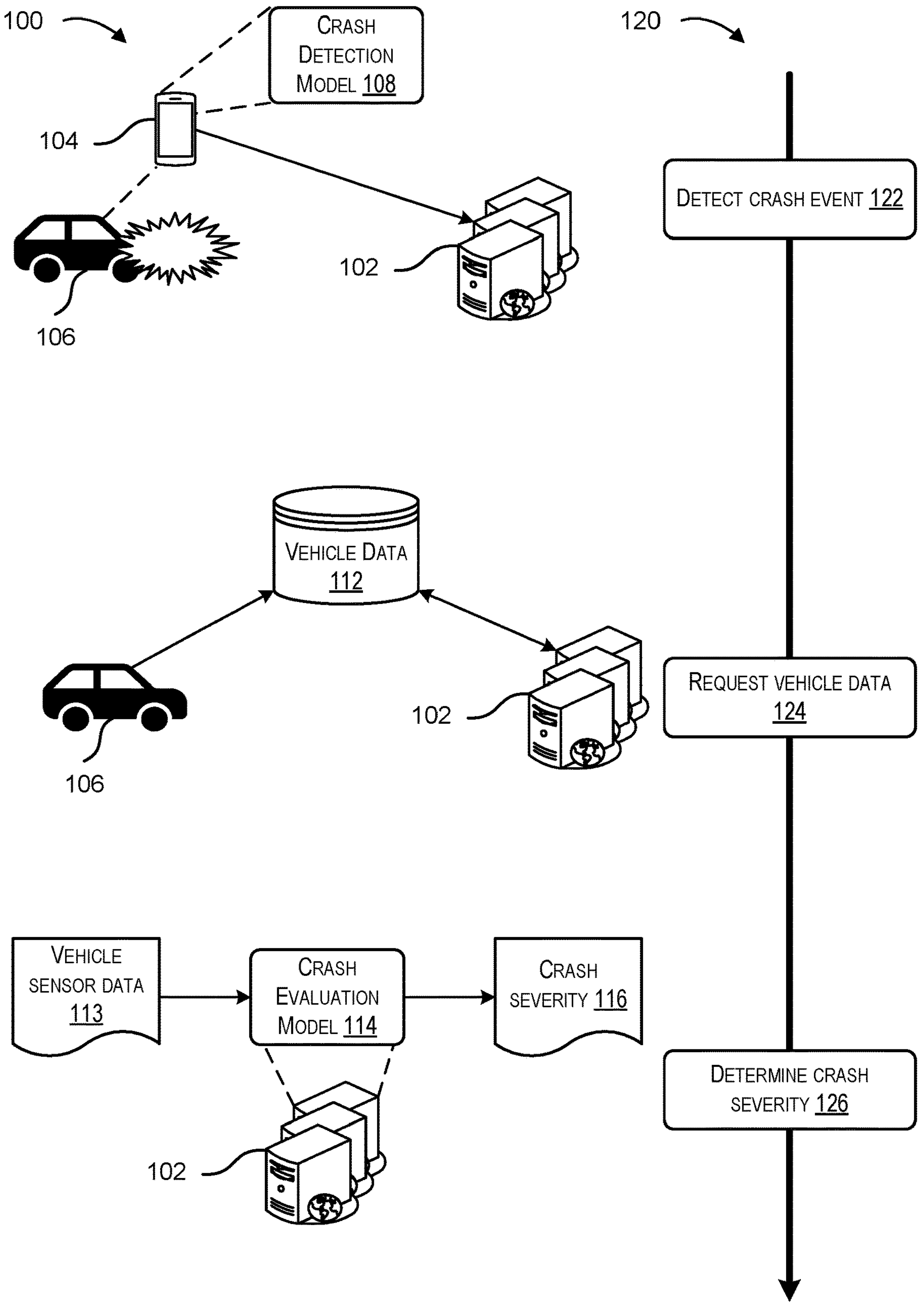
FIG. 1 is a diagram and associated flow chart of an example process to detect a potential crash and transmit vehicle sensor data to a backend server, according to some embodiments.

The present disclosure relates to methods and systems for reducing bandwidth consumption and the consumption of other computing resources by a crash detection and evaluation system for vehicles. Resource consumption can be reduced by implementing various techniques described herein, such as by using a crash detection by a user device (e.g., mobile phone) in the vehicle to trigger the collection of vehicle sensor data and dictate which vehicle sensor data to collect. This technique can allow for substantially more efficient acquisition, management, and transmission of vehicle data among the devices of the vehicle crash detection and evaluation system.

Vehicles, including internal combustion engine and electric automobiles, have increasingly relied on computer control and processing to operate the vehicles' various systems, including engine operation and emission control, electronic stability control, braking, environmental control, and media systems. These control operations rely on various sensor inputs, and vehicles are typically equipped with a wide variety of sensors to produce the data used by the vehicle's computer controller. The integration of smart device capabilities, including network connectivity over cellular, WiFi, Bluetooth, and even satellite networks, has allowed modern vehicles to function as essentially smart computing devices themselves, capable of performing more advanced computational operations as well as transmitting vehicle sensor data to remote devices. Vehicle manufacturers may often obtain data produced from their vehicles during operation for analysis to guide vehicle improvements and to provide that data for use in other systems. However, modern vehicle sensors can produce so much data that the storage, management, and transmission of that data may be computationally expensive and potentially wasteful.

One of the additional uses for vehicle sensor data can be for crash detection and, particularly, crash severity evaluation. Crash detection can include making a preliminary determination of a potential crash event. For example, vehicle drivers typically carry a smartphone with them while operating the vehicle. Smartphones can be equipped with accelerometers that provide device sensor data related to the speed and orientation of the phone and changes thereof. An application running on the smartphone can use the accelerometer data to detect a potential crash, for instance by detecting a rapid change of the speed and orientation of the smartphone. Because the smartphone can move independently of the vehicle, such changes may only indicate a potential crash (for example, if the phone is accidentally dropped within the vehicle), so the application can obtain additional device sensor data to verify the potential crash as a true crash event.

Crash evaluation can include using state of the art modeling techniques, including physics-based and machine learning models, to analyze vehicle sensor data to determine the severity of any crash. For example, a server device can obtain vehicle sensor data as well as information from the user device about the initial crash detection and input this data into a model to evaluate the crash event, including determining whether the vehicle is still functional, whether the vehicle is salvageable and/or repairable, the location on the vehicle and type of damage incurred in the crash event, and the like. The more sophisticated crash evaluation can also use historical crash frequency data and data about the location of the crash as inputs. For instance, the party providing the server device for the crash evaluation model can also maintain data that describes when and how often crash events occur at particular locations on a road system, as well as road condition information, weather, and the like. Because the crash evaluation models may require additional computational resources to execute in a reasonable time, the crash evaluation models may be provided on backend servers and/or cloud servers located remote from the vehicle. Thus, selectively determining the vehicle sensor data sufficient for a suitable output from the model can produce significant improvements in transmitting the vehicle sensor data to the server device.

Additionally, the interrelated devices of the systems described herein, including the vehicle and its computer and control systems, user devices like a smartphone, the backend servers, and/or cloud servers and third-party servers, can allow for the efficient management of the necessary data for the crash detection and crash evaluation. Rather than naively storing and transmitting all possible vehicle sensor data, which can be on the order of 10 TB per hour, for use in crash evaluation, the systems described herein can use a crash detection from the user device to trigger the acquisition of vehicle sensor data within a time frame (e.g., time range) immediately prior to the crash and/or immediately following the crash, thereby reducing the amount of vehicle data transmitted, stored, and evaluated. The vehicle's computer system can be simplified and minimized by only requiring sufficient storage for a certain time period (e.g., 30 minutes) and then only transmitting a portion of the stored data on request from the remote server systems. Moreover, the presence of the user device within the vehicle, and the ability for the vehicle and user device to communicate over other networks than those used to communicate with the remote servers, provide redundancy in the communication paths as well as additional computational resources to obtain and transmit the requisite sensor data.

Turning now to the figures, FIG. 1 is a diagram and associated flow chart of an example process 120 to detect a potential crash and transmit vehicle sensor data to a backend server system 102, according to some embodiments. The diagram shows elements of a system 100 corresponding to the blocks of the process 120. The system 100 can include the backend server system 102, a user device 104, and a vehicle 106 as well as any suitable combination of additional computing devices such as cloud servers and/or additional remote servers. Additional details about different computing systems that are capable of performing the techniques of the disclosure are provided later on with respect to FIG. 3.

The user device 104 can be a smartphone, tablet computer, or other suitable computing device for performing one or more operations of process 120. The user device 104 can be in the possession of a driver of the vehicle 106 or a passenger in the vehicle 106, so that the motion of the user device 104 generally corresponds with the motion of the vehicle 106. The user device 104 can implement a crash detection model 108. The crash detection model 108 can be implemented as part of an application or other software program executing on the user device. For example, a service provider that provides crash evaluation services can provide an application for user devices to aid in the detection and evaluation of potential crash events as described herein.

The process 120 can begin at block 122 with the user device 104 detecting a crash event associated with the vehicle 106. The crash detection model 108 can use device sensors of the user device 104 to detect the crash event. For example, the user device 104 can include one or more accelerometers (e.g., a three-axis MEMS sensor) that can measure acceleration of the user device 104 in three dimensions. The data generated by the accelerometer can show whether the user device 104 experiences any rapid acceleration events. For example, a sudden deceleration of the user device 104 may indicate that the vehicle 106 in which the user device 104 is travelling was involved in a potential crash event. Because the motion of the vehicle 106 can include a variety of accelerations and decelerations, the crash detection model 108 may be configured to detect potential crash events based on a threshold of the change in the motion of the user device 104 indicated by the sensor data. In some embodiments, the crash detection model 108 can be configured to obtain device sensor data from the user device 104 for a time period (e.g., one minute, five minutes, etc.) after the initial detection of a potential crash event. For example, the device may remain motionless for a time after the potential crash event, indicating that the potential crash event may have been a true crash. Using the additional device sensor data can allow the crash detection model 108 to verify the potential crash event before beginning other portions of the crash evaluation process. In addition to accelerometers, the user device 104 can have other sensors including, but not limited to, gyroscopes, barometers, microphones, photosensors, cameras, light detection and ranging (LIDAR) sensors or other depth sensors, and global positioning system (GPS) receivers.

After detecting a crash event, the user device 104 can send an indication to the backend server system 102. The indication can include the time of the crash event and parameters related to any verification of the crash event that was performed by the user device 104. For example, the indication can include parameters that identify the vehicle, a user account of the user device 104 with the service provider, information about the verification of the crash event (e.g., a confidence level for confirming the potential crash as a true crash). The user device 104 can also transmit the device sensor data to the backend server system 102, including additional device sensor data that was collected after the crash event.

The backend server system 102 can be a server system operated by the crash evaluation service provider. The backend server system 102 can include one or more computing devices, including cloud servers and virtual machines (VMs). The backend server system 102 may be an example of a distributed computing system or cloud computing system that can implement a crash evaluation model 114 for performing one or more operations of process 120.

Returning to process 120, at block 124 the backend server system 102 can request vehicle data 112. The request for vehicle data 112 can be made in response to receiving the indication of a crash event from the user device 104. The vehicle data 112 can be stored at a third-party computer system. For example, the manufacturer of the vehicle 106 may obtain vehicle data, including vehicle sensor data, separately from the processes of the crash evaluation service provider. The vehicle manufacturer can maintain third-party server system devices, including cloud computing devices, to provide storage for the vehicle data 112. The vehicle data 112 maintained by the vehicle manufacturer may be a repository for data from multiple vehicles of the manufacturer. As discussed above, vehicles can generate substantial quantities of sensor data, making it computationally expensive for the vehicle 106, the backend server system 102, and a third-party server system to transmit, store, and/or process all of the vehicle sensor data. Accordingly, the request can identify the vehicle 106 and specify a time, for example a time range related to the time of the crash event, and initiate a data collection process from the vehicle 106 to the vehicle data 112 stored with the manufacturer. As part of the data collection process, only a portion of the vehicle sensor data generate by the vehicle 106 may be transmitted to the third-party server system and subsequently transmitted to the backend server system 102.

The vehicle 106 can include one or more sensors including, but not limited to, cameras, acoustic sensors, LIDAR sensors, inertial measurement units, radar sensors, accelerometers, gyroscopes, GPS receivers, position sensors for engine components (throttle, camshaft), voltage sensors for various points in the vehicle's electrical system, temperature sensors, oxygen sensors, knock sensors, rain sensors, photosensors (e.g., for detecting nearby light sources like oncoming vehicles), driver assistance system status, braking system status, airbag deployment indicators, and vehicle light status. The vehicle 106 can also be configured to communicate over one or more networks using one or more communication standards, including WiFi, Bluetooth, cellular networks (e.g., 5G, 4G LTE, etc.), and the like. In some examples, the vehicle 106 can be configured to communicate over wired networks or other physical connections, for example a data cable connected to the user device 104.

At block 126, the backend server system 102 can determine a severity of the crash event. The backend server system 102 can execute a crash evaluation model 114 to analyze the vehicle sensor data 113 and evaluate a crash severity 116. In some examples, the crash evaluation model 114 can be used to analyze device sensor data from the user device 104 in conjunction with the vehicle sensor data 113 to evaluate the crash severity 116. The crash severity 116 may be a value quantifying the damage to the vehicle 106 due to the crash event. In some examples, the crash severity 116 may provide additional information about the state of the vehicle 106, including whether the vehicle 106 remains operable/drivable, whether the vehicle 106 is repairable or otherwise salvageable. In some embodiments, the backend server system 102 can use the crash severity 116 to initiate additional processes for the driver of the vehicle 106. For example, based on the crash severity 116, the backend server system 102 can automatically initiate a towing service for the vehicle 106. The towing service may have a destination corresponding to whether the crash severity 116 indicates that the vehicle 106 is repairable or salvageable. For example, if the vehicle 106 is repairable, the towing service may be automatically initiated to tow the vehicle 106 to a repair shop. If the vehicle 106 is not repairable or otherwise a total loss, the towing service may be automatically initiated to tow the vehicle 106 to a salvage yard. As another example, based on the crash severity 116, the backend server system 102 can automatically initiate a taxi service to pick up the driver of the vehicle 106.

Alternatively or additionally to the user device 104 verifying the crash event, the backend server system 102 can also use the crash evaluation model 114 to verify the crash event using the vehicle sensor data 113 and device sensor data according to some embodiments. The crash evaluation model 114 can be configured to analyze the device sensor data and vehicle sensor data 113 from the user device 104 for time periods before and/or after a potential crash event indicated by the user device 104. For example, the device may remain motionless for a time after the potential crash event, indicating that the potential crash event may have been a true crash.

Figure 2:
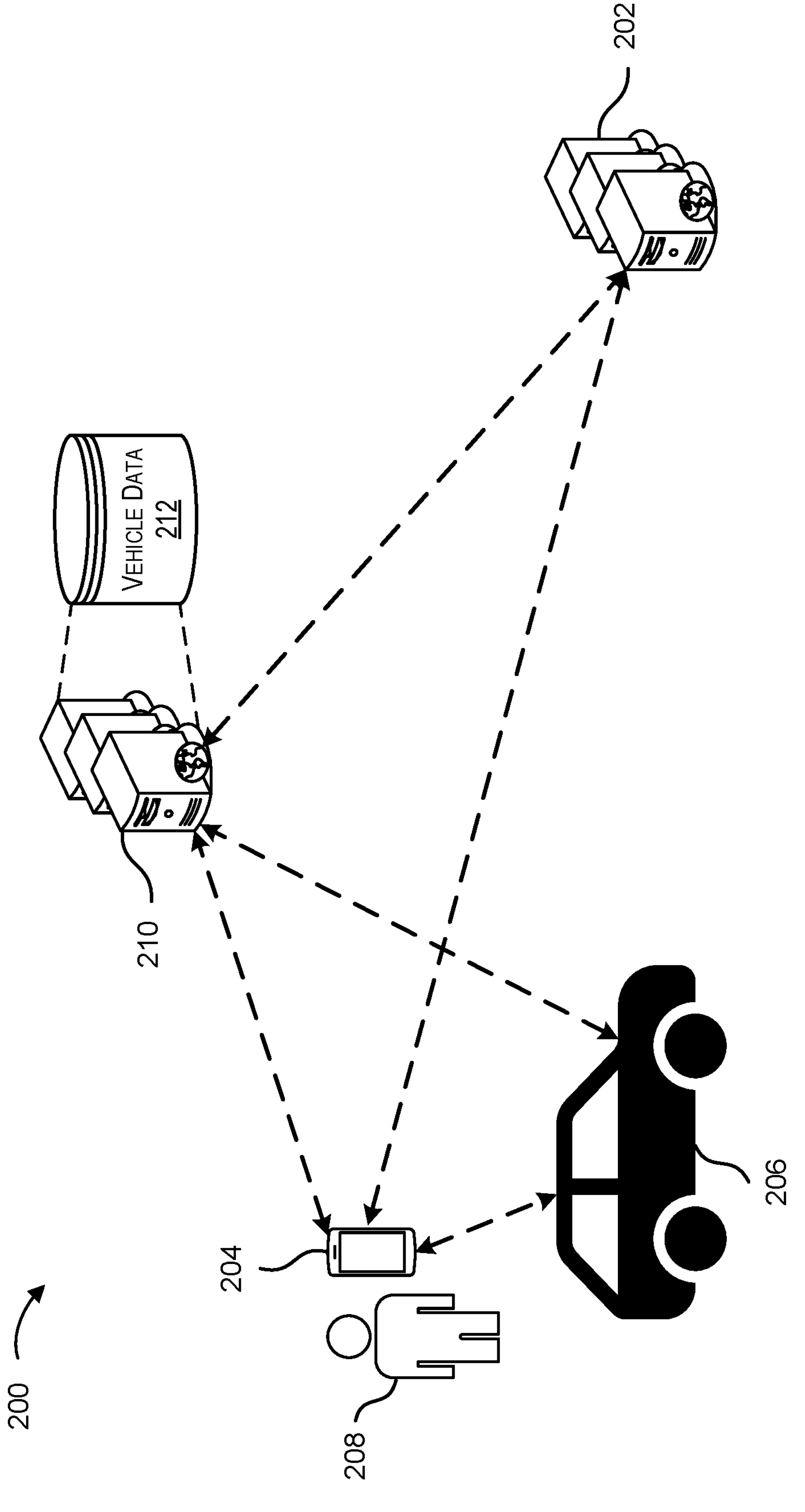
FIG. 2 is a diagram illustrating a system for transmitting vehicle and sensor data between computing devices for the detection and evaluation of crash events, according to some embodiments.

FIG. 2 is a diagram illustrating a system 200 for transmitting vehicle and sensor data between computing devices for the detection and evaluation of crash events, according to some embodiments. The system 200 can include a backend server system 202, a user device 204, a vehicle 206, and a third-party server system 210. The backend server system 202 may be an example of backend server system 102 of FIG. 1. Similarly, the user device 204 and vehicle 206 may be examples of user device 104 and vehicle 106 of FIG. 1. The third-party server system 210 may be part of a cloud computing system or distributed computing system and configured to maintain vehicle data 212 for a manufacturer of the vehicles, including vehicle 206. In some examples, the third-party server system 210 may only receive and store a portion of the vehicle sensor data from the vehicle 206 in response to a request from the backend server system 202, which can reduce the load on networking, storage, and computation resources of the system 200. In some embodiments, the vehicle 206 may be configured to determine what and how much vehicle data to transmit to the third-party server system 210.

As depicted in FIG. 2, the system 200 can include several network-connected computing devices, including the vehicle 206 that, as described above, can include sensors and transceivers. Each device may be wholly or partially controlled by different entities. For example, the backend server system 202 may be operated by a service provider of a crash evaluation service and related software applications, while the user device 204 is operated by a user 208, who may be a driver or passenger of the vehicle 206. The vehicle's software may be primarily provided by the manufacturer of the vehicle, with limited ability for the user 208 to modify the software components of the vehicle 206. The user device 204 may be configured to run an application or other software components provided by the service provider. In some examples, the vehicle 206 may include software components provided by the service provider. For example, the vehicle 206 may run an application using a crash detection model (e.g., crash detection model 108 of FIG. 1) to perform some or all of the operations described above for the initial crash detection and verification. This may allow the system to offload some of the processing from the user device 204 to the vehicle 206, which may reduce consumption of resources on the user device 204.

Each of the computing devices of the system 200 may be continuously or intermittently connected to one another using one or more networks and one or more related communication protocols. The networks may include any one or a combination of many different types of networks, such as the Internet, wireless networks, cellular networks, satellite networks and other private and/or public networks. For example, the user device 204 may connect to and communicate with vehicle 206 via Bluetooth or similar short-range wireless networking technology. The backend server system 202 and third-party server system 210 may be in the cloud as part of separate cloud computing systems and may communicate over the public Internet. The user device 204 can communicate with the backend server system 202 or the third-party server system over the public Internet, using a cellular communication standard like 5G or a wireless standard like WiFi. The vehicle 206 may communicate with the third-party server system 210 over a cellular network, wireless network, satellite network, or the like. Because the vehicle data, including vehicle sensor data, may be controlled by the manufacturer of the vehicle 206, in most instances the vehicle 206 may not communicate directly with the backend server system 202, as depicted by the omission of a connecting arrow in FIG. 2. However, embodiments are contemplated in which the vehicle 206 can communicate with backend server system 202 to transmit vehicle sensor data for use in crash detection and crash evaluation.

The user 208 may maintain an account with the service provider for providing the crash detection and crash evaluation and related services. In some cases, the user 208 may enroll with the service provider via another service, including, for example, an automobile insurance provider. The user 208 may download an application for the user device 204 from the service provider to provide the crash detection while the user 208 operates the vehicle 206. The account may then link the user 208 and the vehicle 206 with the application on the user device 204, allowing for the interoperation of the crash detection and crash evaluation operations discussed herein. By maintaining an account, the service provider can use the crash detection and crash evaluation to provide services including automated towing and taxi dispatch for the user 208.

As discussed above with respect to FIG. 1, during a crash event, the user device 204 will typically be present in the vehicle 206, allowing an application executing on the user device 204 to perform the initial crash detection and crash verification operations. Immediately following a true crash event, the user 208 may interact with the user device 204 in a manner different than while operating the vehicle 206 before the crash event. For example, after a crash event, the vehicle 206 may be disabled or may be brought to a stop by the user 208. The user 208 may leave the vehicle 206 and move around inside or outside the vehicle while holding the user device 204, for instance to inspect the damage and make phone calls. The user device 204 can obtain additional device sensor data during this time period to use in both a crash detection model as part of a software application running on the user device 204 and to provide to the backend server system 202 for use in a more comprehensive crash evaluation model. The user device 204 may also communicate with the vehicle 206 to obtain a portion of the vehicle sensor data for use when verifying a potential crash event.

In some embodiments, the user device 204, via the software application executing thereon, can prompt the user 208 to input additional information regarding the potential crash event. For example, the user device 204 can prompt the user 208 for an explicit confirmation of an actual crash event or to confirm location information determined from GPS positional information. In some embodiments, the backend server system 202 can cause the user device to prompt the user 208 for the input from user 208.

As described briefly above with respect to FIG. 1, the third-party server system 210 may be a cloud computing system of a manufacturer of vehicle 206 or another entity. The third-party server system 210 may be configured to store vehicle data 212 obtained from any or all of the vehicles produced by the manufacturer, including vehicle 206. Because modern vehicles can generate terabytes of data per hour, appropriately selecting suitable and sufficient data to transmit and store can greatly improve the computational efficiency of system 200. Appropriate selection of vehicle data, including vehicle sensor data, can include limiting the vehicle data transmitted from vehicle 206 to third-party server system 210 to one or more specific time frames and/or selecting the particular sensor data. For example, to support the crash evaluation operations, the third-party server system 210 may request vehicle sensor data from vehicle 206 for a time frame of five minutes prior to the time of a crash event. The time frames for vehicle data can also include time frames after the vehicle crash event, and the time frames may have various suitable lengths (e.g., 30 seconds, one minute, three minutes, etc.). As another example, the third-party server system 210 may request vehicle sensor data for only the vehicle speed sensor, GPS receiver, acoustic sensors, and vehicle cameras, rather than engine knock and position sensors. By selecting a sufficient portion of the vehicle sensor data and limiting the data to specified time frames, the quantity of data that may be transmitted from the vehicle 206 to the third-party server system 210 and subsequently to the backend server system 202 can be greatly reduced. In some embodiments, the backend server system 202 may also be able to select the time frames and types of vehicle sensor data to obtain based on a crash detection indication from the user device and the inputs needed for the evaluation model.

Figure 3:
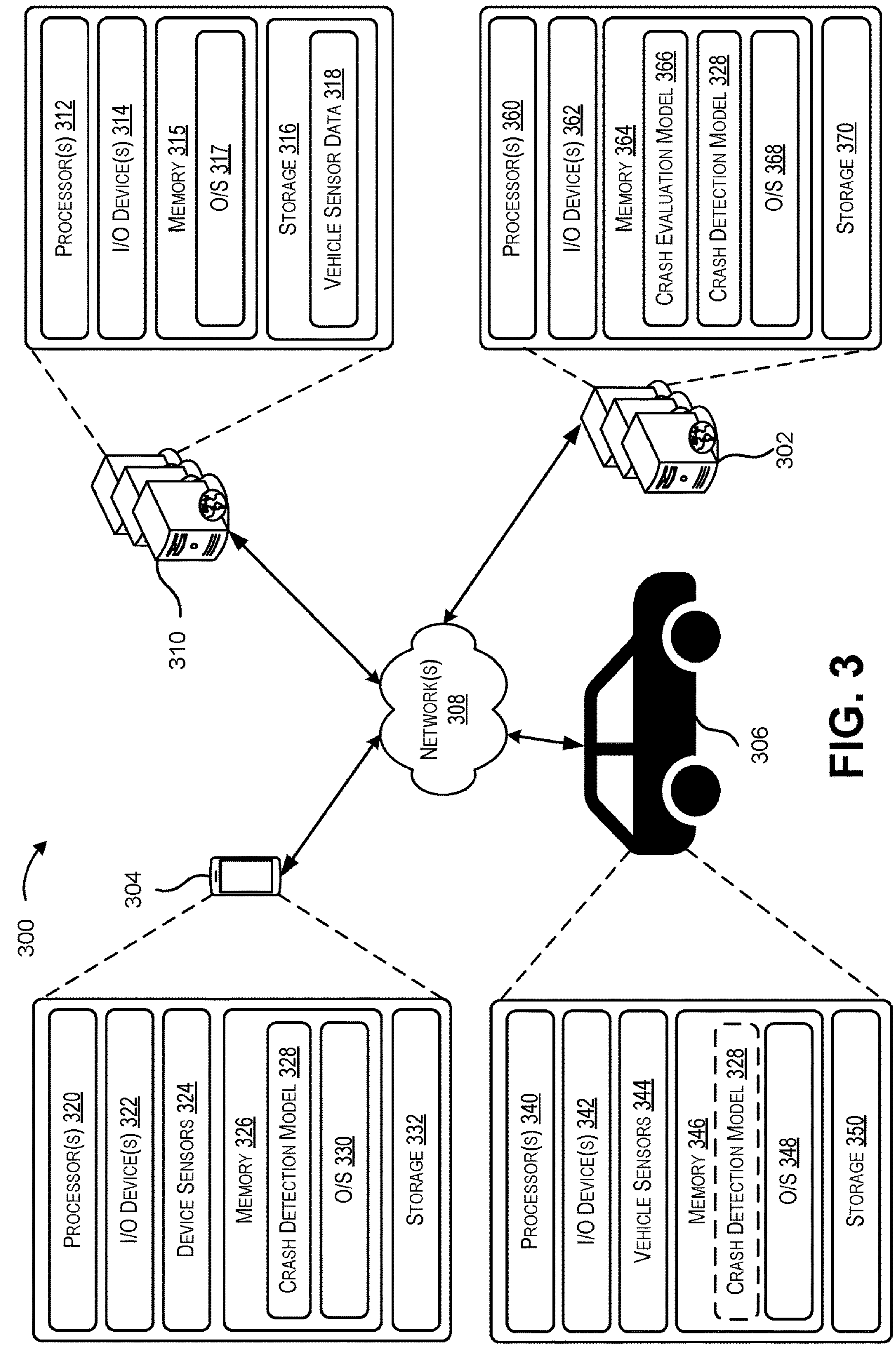
FIG. 3 is a block diagram illustrating an example system architecture of computing devices for the detection and evaluation of crash events, according to some embodiments.

FIG. 3 is a block diagram illustrating an example architecture of a system 300 of computing devices for the detection and evaluation of crash events, according to some embodiments. The system 300 includes a backend server system 302, a user device 304, a vehicle 306, and a third-party server system 310, and one or more network(s) 308. The system 300 may be an example of system 200 described above with respect to FIG. 2. The backend server system 302 may be an example of other backend servers described herein, including backend server system 202 of FIG. 2 and backend server system 102 of FIG. 1. Similarly, the user device may be an example of user device 204 of FIG. 2, the vehicle 306 may be an example of vehicle 206 of FIG. 2, and the third-party server system 310 may be an example of third-party server system 210 of FIG. 2. The network(s) 308 may include any one or a combination of many different types of networks, such as the Internet, wireless networks, cellular networks, and other private and/or public networks.

As described herein, the third-party server system 310 can have at least one memory 315 hosting an operating system 317, one or processor(s) 312, one or more input/output ("I/O") device(s) 314, and a storage 316. The processor(s) 312 can include one processing device or multiple processing devices. Non-limiting examples of the processor(s) 312 include Field-Programmable Gate Arrays (FPGAs), application-specific integrated circuits (ASICs), or microprocessors. The processor(s) 312 can execute instructions stored in memory to perform operations. In some examples, the instructions can include processor-specific instructions generated by a compiler or an interpreter from code written in any suitable computer-programming language, such as C, C++, C #, and Java. The I/O device(s) 314 can include displays, monitors, touch screens, mouse, keyboard, or other I/O device.

The storage 316 may be either removable storage or non-removable storage including, but not limited to, magnetic storage, optical disks, and/or tape storage. The disk drives and their associated computer-readable media may provide non-volatile storage of computer-readable instructions, data structures, program modules, and other data for the third-party server system 310. In these embodiments, the storage 316 may be utilized to store data contents received from one or more other devices, including vehicle sensor data 318 obtained from, for example, vehicle 306.

The user device 304 can have at least one memory 326, one or more processor(s) 320, one or more I/O device(s)

322, and device sensors 324. The processor(s) 320 can include one processing device or multiple processing devices. Non-limiting examples of the processor(s) 320 include FPGAs, ASICs, or microprocessors. The processor(s) 320 can execute instructions stored in memory 326 to perform operations. In some examples, the instructions can include processor-specific instructions generated by a compiler or an interpreter from code written in any suitable computer-programming language, such as C, C++, C #, and Java. The I/O device(s) 322 can include displays, monitors, touch screens, mouse, keyboard, or other I/O devices. The device sensors 324 can include components for acquiring data related to the position, orientation, location, and motion of the user device 304, as well as camera sensors and microphones that may also be included in I/O device(s) 322. Non-limiting examples of device sensors 324 include accelerometers, thermometers, gyroscopes, barometers, microphones, photosensors, cameras, light detection and ranging (LIDAR) sensors or other depth sensors, and global positioning system (GPS) units.

The user device 304 may also include additional storage 332, such as either removable storage or non-removable storage including, but not limited to, magnetic storage or other solid state storage. The disk drives and their associated computer-readable media may provide non-volatile storage of computer-readable instructions, data structures, program modules, and other data for the user device 304. In these embodiments, the storage 332 may be utilized to store data generated by the device sensors 324 or received from one or more other devices in system 300.

The memory 326 may include an operating system 330 and one or more application programs, components, or services for implementing the features disclosed herein, including a crash detection model 328. In some examples, the crash detection model 328 may be executed as part of a larger application hosted on the user device 304, and may be configured to take data from device sensors 324 as inputs to detect a potential crash event. In some examples, the crash detection model 328 may be configured to take additional data from the device sensors 324 as inputs to verify a potential crash event as a true crash event. Additional details about the crash detection model 328 are provided below with respect to FIG. 5A.

As described above, the vehicle 306 may be considered a "smart" computing device with computing and connectivity capabilities similar to modern smartphones and other user devices. Like the user device 304, the vehicle 306 can have at least one memory 346, one or more processing processor(s) 340, one or more I/O device(s) 342, and vehicle sensors 344. The processor(s) 340 can include one processing device or multiple processing devices. Non-limiting examples of the processor(s) 340 include FPGAs, ASICs, or a microprocessors. The processor(s) 340 can execute instructions stored in memory 346 to perform operations. In some examples, the instructions can include processor-specific instructions generated by a compiler or an interpreter from code written in any suitable computer-programming language, such as C, C++, C #, and Java. The processor(s) 340 may also perform operations for the control of the automotive functions of the vehicle 306, including controlling engine performance, operating electronic stability control, antilock braking systems, emission control systems, and the like. In some examples, some of the processor(s) 340 and memory 346 may perform automotive control functions while others of the processor(s) 340 perform operations related to the user interface, for example managing climate control or the media and infotainment system.

The I/O device(s) 342 can include displays, monitors, touch screens, physical knobs, buttons, toggle switches, microphones, speakers, or other I/O devices. The vehicle sensors 344 can include components for acquiring data related to the speed, engine operation, emission control system, braking system, stability control system, as well as camera sensors and acoustic sensors that provide data related to the exterior of the vehicle 306. Non-limiting examples of vehicle sensors 344 include cameras, acoustic sensors, LIDAR sensors, inertial measurement units, radar sensors, accelerometers, gyroscopes, GPS receivers, position sensors for engine components (throttle, camshaft), voltage sensors for various points in the vehicle's electrical system, temperature sensors, oxygen sensors, knock sensors, rain sensors, photosensors (e.g., for detecting nearby light sources like oncoming vehicles), vehicle speed sensors, driver assistance system status, braking system status, airbag deployment indicators, and vehicle light status.

The vehicle 306 may also include additional storage 350, such as either removable storage or non-removable storage including, but not limited to, magnetic storage or other solid state storage. The disk drives and their associated computer-readable media may provide non-volatile storage of computer-readable instructions, data structures, program modules, and other data for the vehicle 306. In these embodiments, the storage 350 may be utilized to store data generated by the vehicle sensors 344. As described previously, the vehicle sensors 344 may produce substantial amounts of data, such that it would be computationally wasteful to store all of the vehicle sensor generated during vehicle trips of more than several minutes in length. Accordingly, the storage 350 may be configured to store a certain amount of vehicle sensor data from the vehicle sensors 344 (e.g., one hour of data, 30 minutes of data, etc.). When vehicle sensor data is to be transmitted to other devices in the system 300 (e.g., when requested by third-party server system 310, or when transmitting to backend server system 302 using user device 304 as a networking relay), a portion of the vehicle sensor data stored in storage 350 may be selected and transmitted.

The memory 346 may include an operating system 348 and one or more application programs, components, or services for implementing the features disclosed herein, including, in some embodiments, the crash detection model 328. In these embodiments, all or a portion of the crash detection model 328 may be executed on the vehicle 306 in combination with or alternatively to the user device 304. As with the user device 304, the crash detection model may be executed as part of a larger application hosted on the vehicle 306, and may be configured to obtain device sensor data from the user device as inputs to detect a potential crash event. In examples in which crash detection is performed by the vehicle 306, the crash detection model 328 may be configured to take data from the vehicle sensors 344 as additional inputs to detect the crash event.

Turning now to the backend server system 302, the backend server system 302 can have at least one memory 364, one or more processor(s) 360 and one or more I/O device(s) 362. The processor(s) 360 can include one processing device or multiple processing devices. Non-limiting examples of the processor(s) 360 include FPGAs, ASICs, or a microprocessors. The processor(s) 360 can execute instructions stored in memory 364 to perform operations. In some examples, the instructions can include processor-specific instructions generated by a compiler or an interpreter from code written in any suitable computer-programming language, such as C, C++, C #, and Java. The I/O device(s) 362 can include displays, monitors, touch screens, mouse, keyboard, or other I/O devices.

The backend server system 302 may also include additional storage 370, such as either removable storage or non-removable storage including, but not limited to, magnetic storage or other solid state storage. The disk drives and their associated computer-readable media may provide non-volatile storage of computer-readable instructions, data structures, program modules, and other data for the backend server system 302. In these embodiments, the storage 370 may be utilized to store crash detection indications and device sensor data from the user device 304, vehicle sensor data from the vehicle 306 and/or the third-party server system 310, and other data used as inputs for a crash evaluation model 366, including, for example, historical crash frequency information and road network information.

The memory 364 may include an operating system 368 and one or more application programs, components, or services for implementing the features disclosed herein, including the crash evaluation model 366 and the crash detection model 328. In some examples, the crash evaluation model 366 may be configured to take device sensor data, vehicle sensor data, historical crash frequency information, and/or road network information as inputs to evaluate the severity of a crash event. Additional details about the crash evaluation model 366 are provided below with respect to FIG. 5B. The crash detection model 328 can be a version of the crash detection model 328 described above with respect to the user device 304 and the vehicle 306. The crash detection model 328 may provide a more sophisticated crash detection analysis when executed on the backend server system 302, for example due to potentially greater computing resources and a larger amount of data available at the backend server system 302 as compared to the user device 304 or the vehicle 306.

Figure 4:
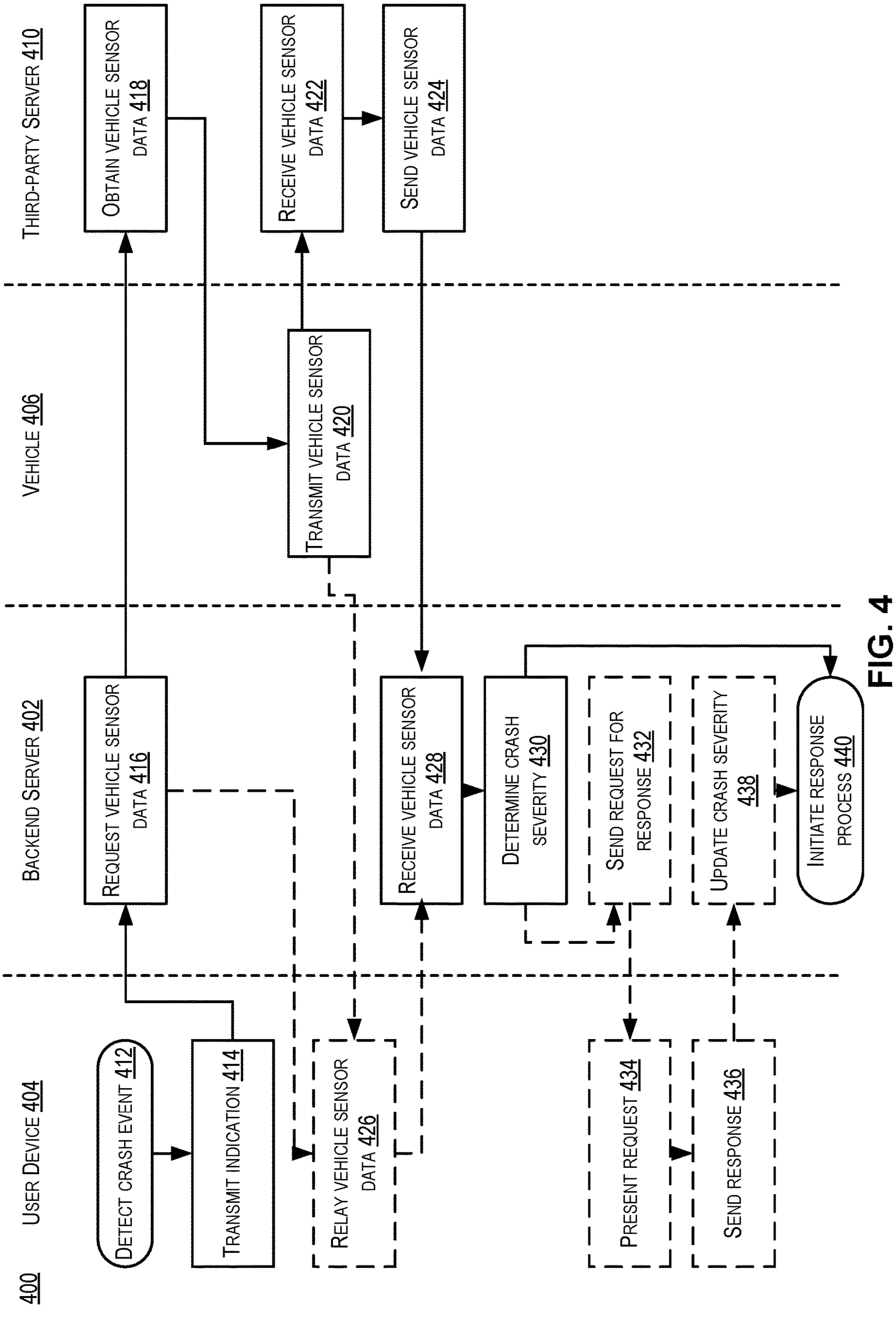
FIG. 4 is a sequence diagram of an example process for detecting a crash event and transmitting vehicle sensor data to a backend server, according to some embodiments.

FIG. 4 is a sequence diagram of an example process 400 for detecting a crash event and transmitting vehicle sensor data to a backend server system 402, according to some embodiments. The process 400 may be performed by one or more components of a system, including the backend server system 402, user device 404, vehicle 406, and third-party server system 410, which may be examples of similarly named components described herein, including backend server system 302, user device 304, vehicle 306, and third-party server system 310 of FIG. 3. The process 400 is illustrated as a logical flow diagram, each operation of which represents a sequence of operations that can be implemented in hardware, computer instructions, or a combination thereof. In the context of computer instructions, the operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 400 (or any other processes described herein, including process 600 or process 700, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Process 400 may begin at start point 412 with the user device 404 detecting a crash event of a vehicle 406. Detecting the crash event can include obtaining device sensor data from the user device 404 and inputting the device sensor data into a crash detection model (e.g., crash detection model 328 of FIG. 3). For example, the user device 404 can use accelerometer data as an input into a detection model to determine if a significant deceleration of the user device 404 has occurred. As part of detecting a crash event, the user device can also verify a potential crash event by obtaining additional device sensor data to input into the crash detection model. For example, after detecting the potential crash event associated with a rapid deceleration of the user device, the user device 404 can obtain additional device sensor data for a predetermined time frame (e.g., 2 minutes) after the potential crash event. Because the driver of the vehicle 406 may take the user device 404 out of the vehicle 406, and/or move the user device 404 in a manner that can be distinguished from the motion of the user device 404 in the vehicle 406 prior to the potential crash event, collecting the additional device sensor data may allow for a more accurate determination of whether a true crash event occurred.

At block 414, the user device can transmit an indication of the crash event to the backend server system 402. The indication can include information about how the crash event was detected, whether and to what confidence the crash event was verified, the time of the crash event, an identification of the vehicle 406, and/or an identification of a user account associated with a service provider, such as the service provider that provides the crash detection model.

At block 416, in response to receiving the indication of the crash event from the user device 404, the backend server system 402 can request vehicle sensor data. The request may be made to the third-party server system 410. As described above, the third-party server system 410 may be associated with or under the control of a manufacturer of the vehicle 406. In some embodiments, the request can specify the time of the crash event, a vehicle identification (e.g., a VIN number), a vehicle type, and other parameters that can be used to identify the vehicle and determine the amount and type of vehicle sensor data sufficient to use for crash evaluation. For example, the request may specify a time range of ten minutes immediately prior to the crash event. In other examples, the request may specify a time range immediately after the crash event, or time ranges both before and after the crash event.

Based on the request, the third-party server system 410 can obtain vehicle sensor data, at block 418. Obtaining the vehicle sensor data can include sending a signal to the vehicle 406 that specifies which vehicle sensor data is requested and the time frames to which the data corresponds. The vehicle 406 can transmit the corresponding vehicle sensor data to the third-party server system 410, at block 420. In this arrangement, the vehicle 406 may only transmit a limited amount of vehicle sensor data upon request by the third-party server system 410, which can reduce bandwidth consumption and the consumption of other computing resources. Alternatively, the vehicle 406 may automatically transmit, periodically or in real-time, some or all of its vehicle sensor data to the third-party server system 410, which can store the vehicle sensor data in a datastore (e.g., in storage 316 of FIG. 3) for subsequent use. Either way, the third-party server system 410 can receive the vehicle sensor data, at block 422, and then send the vehicle sensor data to the backend server system 402, at block 424, in response to the request of the backend server system 402. By selecting a portion of the vehicle sensor data to transmit to the backend server system 402 and/or the third-party server system 410 according to short time frames, the amount of data that is transmitted between the computing devices is significantly reduced.

In some embodiments, the backend server system 402 may alternatively send the request for the vehicle sensor data to the user device 404. For example, the crash event may have damaged the vehicle's ability to communicate over a cellular network connection with the third-party server system 410, while the user device 404 retains its ability to communicate with the backend server system 402 via a cellular network. In this example, the user device 404 can connect to the vehicle 406 using Bluetooth or a wired connection to obtain the requested vehicle sensor data. The user device 404 can then relay (e.g., transmit) the vehicle sensor data to the backend server system 402, at block 426.

At block 428, the backend server system 402 can receive the vehicle sensor data. The vehicle sensor data can be used as an input into a crash evaluation model (e.g., crash evaluation model 366 of FIG. 3). In some embodiments, the backend server system 402 can also obtain device sensor data from the user device 404 to use as an input into the crash evaluation model. At block 430, the backend server system 402 can execute the crash evaluation model to determine a severity of the crash event. For example, the crash evaluation model can take as inputs accelerometer data from the vehicle 406, data about which airbags deployed, and vehicle speed data to evaluate the severity. As described herein, the severity of the crash event may be one or more numerical values that quantify the extent of damages to the vehicle 406 due to the crash event. For example, the severity may be a value scaled according to a predicted damage value relative to a determined value of the vehicle 406.

Based on the severity of the crash event, the backend server system 402 may initiate one or more response processes, at end point 440. For example, if the severity indicates that the vehicle 406 is repairable, the backend server system 402 may automatically initiate a tow process and specify a repair shop as the destination. The tow process may be initiated without additional input from a driver of the vehicle. As another example, if the severity indicates that the damage to vehicle 406 exceeds the total value of vehicle 406, the backend server system 402 may automatically initiate a tow process and specify a salvage yard as the destination. In addition, the backend server system 402 may dispatch a taxi service to the location of the vehicle 406 to retrieve the driver, where said location can be determined based on GPS data from the vehicle 406 or the user device 404.

In some embodiments, the backend server system 402 may update or refine the severity. For example, the crash evaluation model may determine the severity but indicate that additional information from the user device would likely improve the evaluation. The backend server system 402 can send a request for a response to the user device 404, at block 432. In response, at block 434, the user device 404 can present the request as a prompt or other indication at the user device 404. The driver or other user can provide input to the user device 404, after which the user device can send the response, at block 436. As an illustrative example, the severity determined by the crash evaluation model may be improved with user input providing or confirming the location of the crash impact. After receiving the response, the crash evaluation model can update the crash severity, at block 438, and the backend server system 402 can subsequently initiate response processes.

It should be appreciated that the specific steps illustrated in FIG. 4 provide a particular method of detecting a crash event and transmitting vehicle sensor data to a backend server system according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5A:
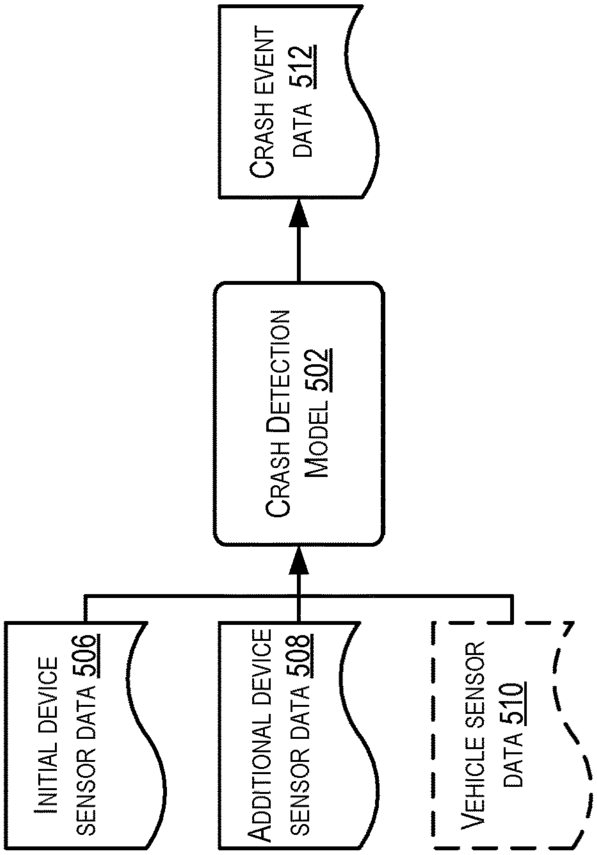
FIG. 5A is a block diagram illustrating the inputs and outputs of a crash detection model, according to some embodiments.

FIG. 5A is a block diagram illustrating the inputs and outputs of a crash detection model 502, according to some embodiments. The crash detection model 502 may be implemented on a user device (e.g., user device 304 of FIG. 3) as part of an application executing on the user device. For example, a service provider may provide crash detection and crash evaluation services for a vehicle operator and provide an application for a user device that can travel with a vehicle (e.g., vehicle 306 of FIG. 3). In some embodiments, the crash detection model 502 and associated application may execute on the vehicle.

The crash detection model 502 can take as inputs the initial device sensor data 506 and the additional device sensor data 508. The initial device sensor data 506 may be data generated by device sensors (e.g., device sensors 324 of FIG. 3) in a time frame prior to a potential crash event. For example, the crash detection model 502 and corresponding application may continuously monitor device sensor data like a device accelerometer and GPS. If a potential crash is indicated by the accelerometer data and/or location data, the crash detection model 502 can obtain the device accelerometer data and/or location data for ten seconds prior to the potential crash as the initial device sensor data 506. The additional device sensor data 508 may be data generated by device sensors in an additional time frame after the potential crash event. For example, the crash detection model 502 may, after identifying the potential crash event, continue to obtain device accelerometer data and/or location data for 60 seconds after the potential crash event as the additional device sensor data 508.

In some embodiments, the crash detection model 502 can also obtain vehicle sensor data 510. For example, the user device may communicate with the vehicle via Bluetooth, another wireless networking connection, or a wired connection to obtain data from one or more vehicle sensors such as a vehicle speed sensor. The vehicle sensor data 510 may be used by the crash detection model 502 to improve the detection and/or verification of a potential crash event.

The crash detection model 502 can generate crash event data 512. For example, the crash detection model 502 may be configured to determine that a change in accelerometer data that exceeds a threshold corresponds to a sudden stop of the vehicle in which the user device is traveling. Because the motion of the user device can be independent from the vehicle in which the user device is traveling, the indication of the crash event may be preliminary. For example, the user device may be dropped while in the vehicle, which can result in initial accelerometer data that the crash detection model 502 may interpret as exceeding a threshold. The crash detection model 502 may then use additional accelerometer data and/or a portion of vehicle sensor data 510 to confirm the initial detection. The detected crash event data 512 output from the crash detection model 502 can include information characterizing the detection. For example, the crash event data 512 can specify the time of the crash event, the type of device sensor data used to detect the crash event, a confidence level of the detection, whether and what type of additional device sensor data 508 and vehicle sensor data 510 was used to detect the crash event. The crash event data 512 may be used by a crash evaluation model 504 to selectively determine the type and amount of vehicle sensor data 510 sufficient to perform the more comprehensive crash evaluation process.

The crash detection model 502 may include one or more computational models, including predictive models, machine learning (ML) models, tree models, frequency models, physics-based models, neural networks, and hybrid combinations of these models. As one example, the crash detection model 502 may be a physics-based model that can use device sensor data to determine physical parameters (e.g., forces, accelerations, rotations) to detect a potential crash event based on one or more of the determined physical parameters exceeding and/or falling below a threshold. As another example, the crash detection model 502 may be a neural network trained to predict and/or verify a potential crash event. The neural network may be trained (e.g., supervised learning) using historical crash events and associated device sensor data and/or vehicle sensor data in which historical crash event severities are used to tag the training data during the training process.

Separating the functions of the crash detection model 502 from the crash evaluation model 504, described below with respect to FIG. 5B, may reduce the amount of processing on the user device. It may also allow the user device and associated computing devices in the crash evaluation system (e.g., a backend server system 302 of FIG. 3) to reduce the amount of vehicle sensor data transmitted and stored among the computing devices. For example, the crash detection model 502 may detect and verify a crash event using device sensor data, without receiving additional vehicle sensor data 510 or only receiving a small portion of vehicle sensor data 510, thereby allowing the crash detection model 502 to operate in an efficient manner on the user device and reducing the transmission and storage of large quantities of sensor data. By verifying potential crash events, the crash detection model 502 may initiate the more data-intensive crash evaluation process only after a true crash has been detected, preventing excessive or spurious transmission of vehicle sensor data 510 to other devices (e.g., third-party server system 310 of FIG. 3). In some examples, the crash detection model 502 can be implemented on a backend server system to perform analysis of initial device sensor data 506, additional device sensor data 508, and/or vehicle sensor data 510.

Figure 5B:
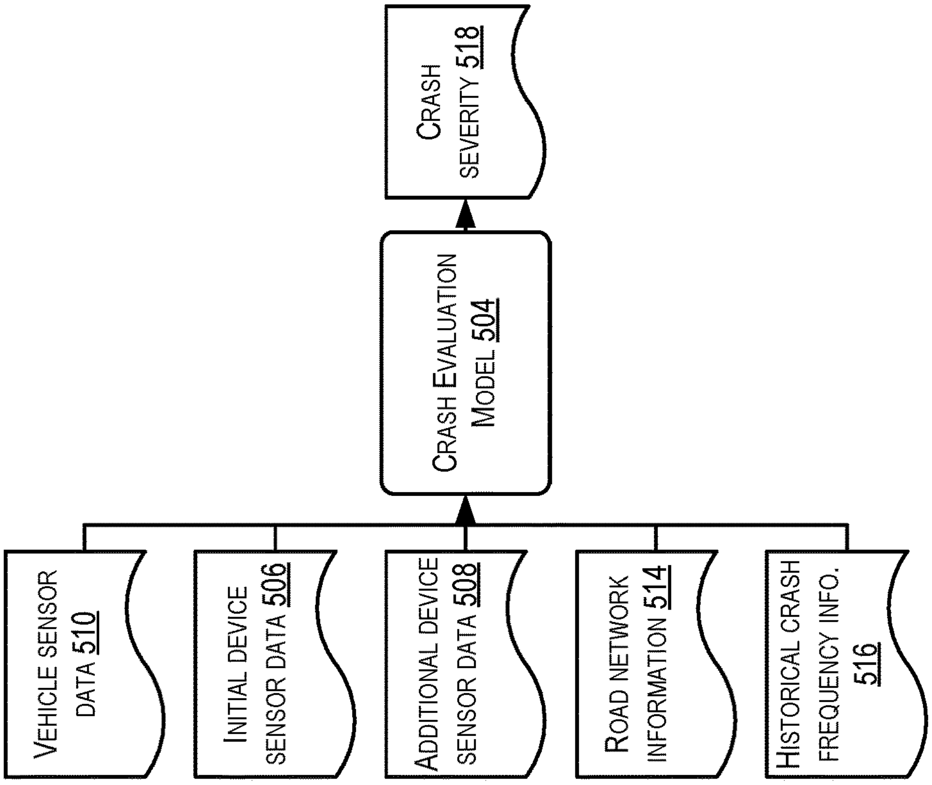
FIG. 5B is another block diagram illustrating the inputs and outputs of a crash evaluation model, according to some embodiments.

FIG. 5B is another block diagram illustrating the inputs and outputs of a crash evaluation model 504, according to some embodiments. The crash evaluation model 504 may be implemented on a backend server system (e.g., backend server system 302 of FIG. 3) managed by the service provider.

The crash evaluation model 504 can take as inputs vehicle sensor data 510. The vehicle sensor data 510 may be obtained for the crash evaluation model 504 from a third-party server system (or from the user device acting as a relay) that obtains the vehicle sensor data from the vehicle on request. The request may specify the type and amount of vehicle sensor data 510 to obtain for use with the crash evaluation model 504, so that only a portion of all the vehicle sensor data 510 available at the vehicle is transmitted between the computing devices. In some embodiments, the crash evaluation model 504 can also take as inputs the initial device sensor data 506, the additional device sensor data 508, road network information 514, and/or historical crash frequency information 516. The initial device sensor data 506 and the additional device sensor data 508 may be transmitted to the backend server system from the user device along with the crash event data 512 or upon request from the backend server.

The crash evaluation model 504 may include one or more computational models, including predictive models, machine learning (ML) models, tree models, frequency models, physics-based models, neural networks, and hybrid combinations of these models. As one example, the crash evaluation model 504 may be a physics-based model that can use vehicle sensor data to determine physical parameters (e.g., forces, loads, stress, moments) of the detected crash event as applied to the materials and other components of the vehicle to model deformation of and damage to the vehicle in response to the determined physical parameters. Based on the physical parameters and modeled vehicle response, the crash evaluation model can generate a severity for the crash event. As another example, the crash evaluation model 504 may be a neural network trained to predict a severity value from the input vehicle sensor data 510. The neural network may be trained (e.g., supervised learning) using historical crash events and associated vehicle sensor data in which historical crash event severities are used to tag the training data during the training process.

The road network information 514 can include details about the location at which the crash event occurred. The road network information 514 can include regulatory parameters of the location like speed limits or the presence/absence of traffic control devices like stop lights, as well as structural information about the road like the number of lanes of travel, absence of shoulders, bridges and overpasses, active construction zones, or recent changes to the configuration. For example, the road network information 514 could identify that the location is a high-speed controlled-access freeway with a 70 mph speed limit or that the location is a two-lane highway with a 50 mph speed limit. In some examples, the road network information 514 can also include current conditions for the location at the time of the crash event like precipitation. The road network information 514 can be used by the crash evaluation model 504 to improve evaluations of the severity. For example, vehicle sensor data 510 indicating a vehicle speed in excess of a speed limit may be indicative (in the model) that the crash event has a "higher" severity than would be indicated by the vehicle speed alone.

Historical crash frequency information 516 can include the incidence rate of crash events at particular locations and/or with specific vehicle conditions (e.g., speed) at the time of the crash event. For example, a particular location on a highway with numerous sharp curves may have a high historical incidence of crash events, particularly when vehicles travel on that highway above a certain speed. The historical crash frequency information 516 can be used by the crash evaluation model 504 to improve evaluations of the severity. For example, vehicle sensor data 510 indicating that the crash event occurred at a historically dangerous part of the road network with the vehicle traveling at a high speed may indicate that the severity of the crash event is "higher" than would be indicated by the speed of the vehicle alone.

The crash evaluation model 504 may generate a crash severity 518. The crash severity 518 may be one or more values that quantify the extent of damages to the vehicle due to the crash event. For example, the severity may be a numerical value scaled according to a predicted damage value relative to a determined value of the vehicle.

Figure 6:
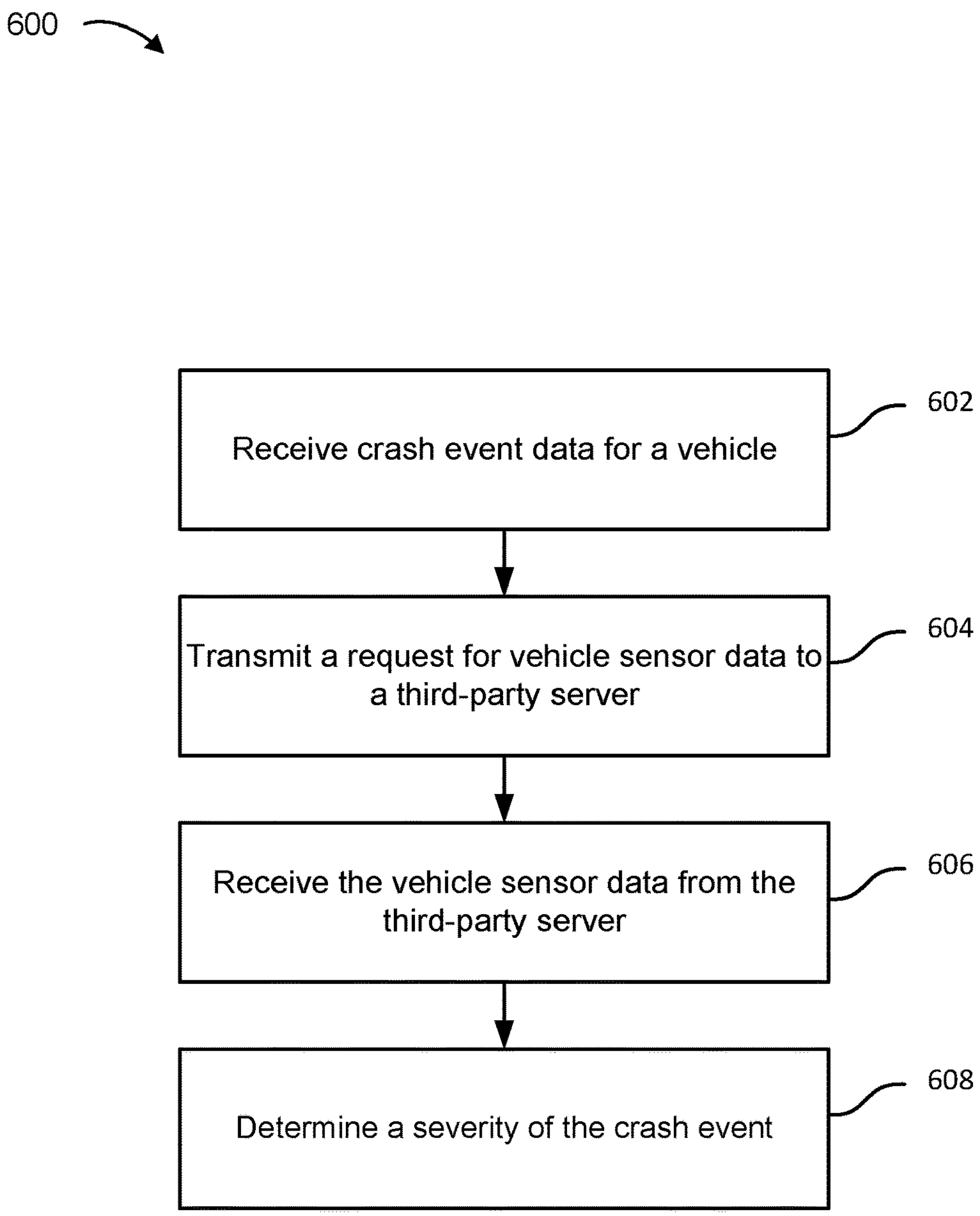
FIG. 6 is a flow diagram of an example process for obtaining vehicle sensor information by a backend server system and evaluating a severity of a crash event, according to at least one embodiment.

FIG. 6 is a flow diagram of an example process 600 for obtaining vehicle sensor information by a backend server system and evaluating a severity of a crash event, according to at least one embodiment. The process 600 may be performed by the backend server, for example backend server system 302 of FIG. 3. Some of the operations described with respect to process 600 may be similar to operations described above with respect to process 400 of FIG. 4.

The process 600 may begin at block 602 with the backend server system receiving crash event data (e.g., crash event data 512 of FIG. 5) for a vehicle (e.g., vehicle 306 of FIG. 3). The crash event data may be received from a user device (e.g., user device 304 of FIG. 3) that was present within the vehicle at the time of the crash event. The crash event data can include a time of a crash event, the location of the crash event, and an indication that the crash event was verified using additional device sensor data. The crash event data can also include user device sensor data, a vehicle identifier, and/or an account identifier for the user.

At block 604, in response to receiving the crash event data, the backend server system can transmit a request for vehicle sensor data for the vehicle involved in the crash event. The request can be transmitted to a remote system, such as a third-party server system (e.g., third-party server system 310 of FIG. 3) or the user device, in some embodiments. The request can include a time range preceding the time of the crash event. For example, the backend server system can determine that vehicle sensor data for ten minutes prior to the time of the crash event may be sufficient for evaluating a crash severity and the request the data generated during that ten minute time range. In some embodiments, the request can include an additional time range after the time of the crash event.

At block 606, the backend server system can receive the vehicle sensor data. Because the backend server system may not communicate directly with the vehicle, the vehicle sensor data may be received from the third-party server system or the user device. The third-party server system and/or the user device may communicate with the vehicle directly and can therefore obtain the requested vehicle sensor data from the vehicle.

At block 608, the backend server system can determine a severity of the crash event. The backend server system can execute a model (e.g., crash evaluation model 504) that takes the crash event data and the vehicle sensor data as inputs. The crash severity may be one or more values that quantify the extent of damages to the vehicle due to the crash event. The crash evaluation model may be a machine learning model previously trained on historical vehicle sensor data and historical crash severity data. In some embodiments, the model is a physics-based model.

In some embodiments, the backend server system can maintain additional input information including road network information (e.g., road network information 514) and historical crash frequency information (e.g., historical crash frequency information 516). The road network information can include information about the road location of the user device at the time of the crash event. The additional input information may be stored in a data store accessible to the backend server. The backend server system can input the additional input information into the model to determine the severity of the crash event.

In some embodiments, the backend server system can transmit a communication to the user device prompting a response. The backend server system can transmit the communication in response to receiving the crash event data from the user device and/or based on the severity of the crash event determined by the crash evaluation model. The communication can be a prompt for the user to confirm the location of the crash event, confirm the validity of the crash event, confirm the location of vehicle damage on the vehicle, or confirm similar additional information. Upon receiving the response from the user device, the backend server system can update the severity of the crash event based on the response.

In some embodiments, the backend server system can initiate one or more processes in response to the determined severity of the crash event. For example, based on the severity of the crash event, the backend server system can initiate a vehicle tow process with a tow service. As another example, based on the severity of the crash event, the backend server system can initiate a taxi pickup process with a taxi service.

It should be appreciated that the specific steps illustrated in FIG. 6 provide a particular method for obtaining vehicle sensor information by a backend server system and evaluating a severity of a crash event according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
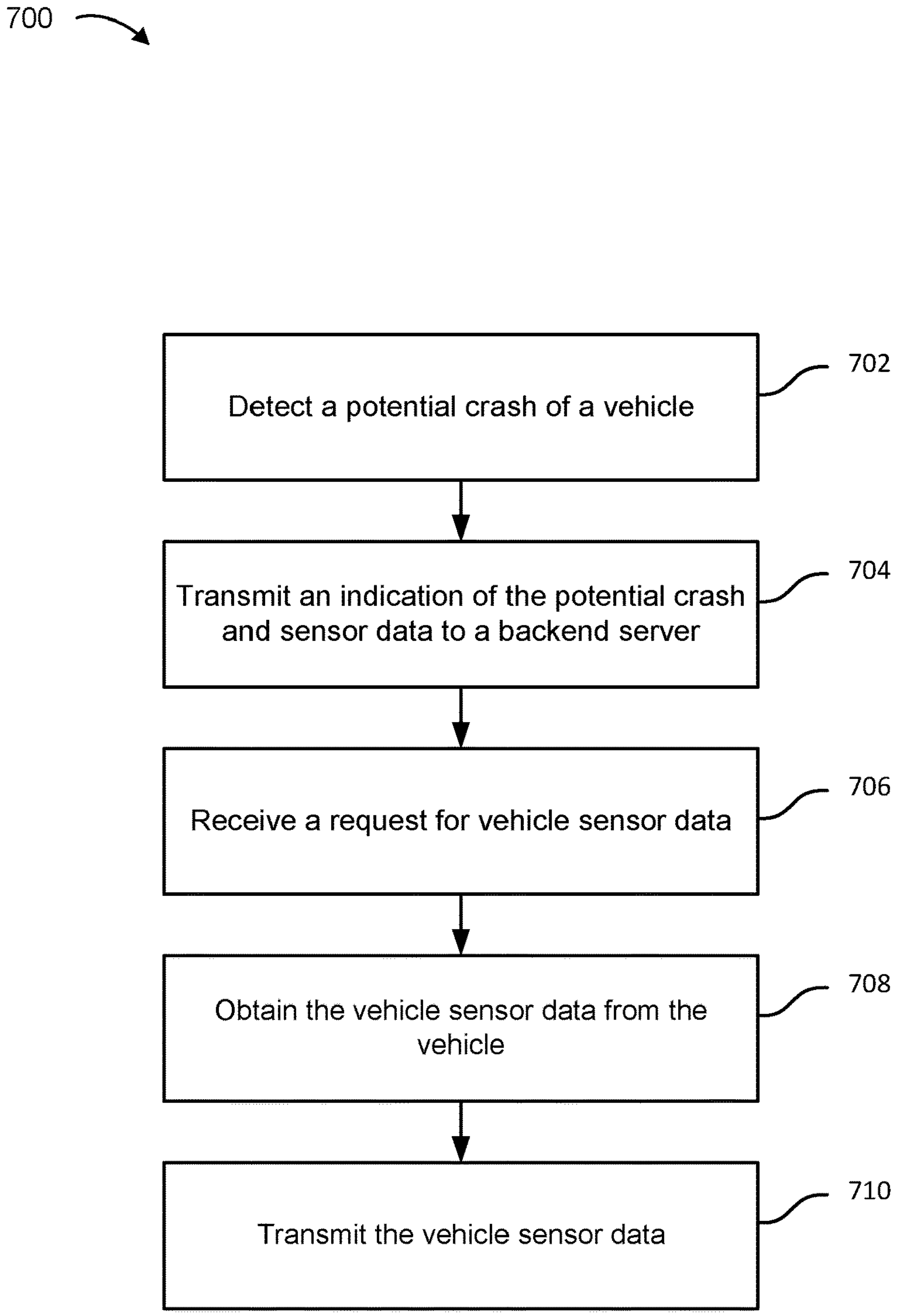
FIG. 7 is a flow diagram of an example process for a user device detecting a potential crash and obtaining and transmitting vehicle sensor data to a backend server, according to at least one embodiment.

FIG. 7 is a flow diagram of an example process 700 for a user device detecting a potential crash and obtaining and transmitting vehicle sensor data to a backend server, according to at least one embodiment. The process 700 may be performed by the user device, for example user device 304 of FIG. 3. Some of the operations described with respect to process 700 may be similar to operations described above with respect to process 400 of FIG. 4.

The process 700 may begin at block 702 with the user device detecting a potential crash of a vehicle. The user device can use sensor data from one or more device sensors (e.g., device sensors 324 of FIG. 3) as inputs into a crash detection model (e.g., crash detection model 502 of FIG. 5) to detect the potential crash. The user device may be present in the vehicle at the time of the potential crash.

At block 704, the user device can transmit an indication of the potential crash to a backend server. The indication can be transmitted in response to detecting the potential crash. Along with the indication, the user device can transmit the sensor data used to detect the potential crash and other details, such as an account identifier or a vehicle identifier.

At block 706, the user device can receive a request for vehicle sensor data. The request may be received from the backend server. The request may specify a time frame for the vehicle sensor data prior to the time of the potential crash event. In some embodiments, the request may specify an additional time frame for the vehicle sensor data after the time of the potential crash event.

At block 708, the user device can obtain the vehicle sensor data from the vehicle. For example, the user device may connect to the vehicle using a Bluetooth connection or a data cable connection to obtain the vehicle sensor data. The user device may obtain a portion of all vehicle sensor data stored in the vehicle that corresponds to the time frame defined in the request. The user device may therefore act as a relay for transmitting the vehicle sensor data to the backend server, for example in the event that the vehicle is unable to communicate with a third-party server.

At block 710, the user device can transmit the vehicle sensor data to the backend server. As described throughout the present disclosure, computational resources are saved by transmitting the vehicle sensor data for the specified time frame rather than all the vehicle sensor data generated by the vehicle. Computational resources may also be saved by only transmitting this limited vehicle sensor data to the backend server system in response to a detection of a crash event.

It should be appreciated that the specific steps illustrated in FIG. 7 provide a particular method of a user device detecting a potential crash and obtaining and transmitting vehicle sensor data to a backend server according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, the user device may execute a second model that can perform operations similar to a crash evaluation model (e.g., crash evaluation model 504 of FIG. 5). The user device can then determine a preliminary severity of the potential crash prior to transmitting the vehicle sensor data to the backend server. For example, the user device may execute a version of the crash evaluation model that can run quickly on a user device to produce the preliminary severity before the more robust crash evaluation model is executed on the backend server. In this way, the user device can select, based on the preliminary severity, the appropriate portion of the vehicle sensor data to transmit to the backend server system without additional communications between the user device and the backend server.

In some embodiments, the user device can obtain additional sensor data from the device sensors. The additional sensor data may be generated during a second time frame after the time of the potential crash. For example, the user device can collect the additional sensor data for a minute after the potential crash. During the second time frame, the user device may be manipulated by a user in a manner that may be indicative that the potential crash is a true crash. For example, the additional sensor data can include accelerometer data corresponding to movement of the user device in the second time frame after the time of the potential crash, where the user walks around the disabled vehicle following the potential crash event while the vehicle remains stationary. Using the additional sensor data, the user device can determine a validity of the potential crash prior to transmitting the indication to the backend server. Based on the validity of the potential crash, the user device can also transmit the additional sensor data to the backend server.

In some embodiments, the device sensor data used for detecting the potential crash includes device sensor data for a third time frame preceding the time of the potential crash. For example, the user device may maintain sensor data for 30 seconds, one minute, 5 minutes, or more time prior to detecting a potential crash. To verify the validity of the potential crash, the user device can determine a portion of the sensor data generated during the third time frame preceding the time of the potential crash and input the portion of the sensor data into the model to generate a crash event detection. The crash event detection can include crash event data specifying that the potential crash was verified and the portion of the sensor data used to perform the verification.

While examples and features of disclosed principles are described herein, modifications, adaptations, and other implementations are possible without departing from the spirit and scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein, the singular forms “a,” “an,” and “the” include plural references unless the context clearly dictates otherwise.

It is also understood that the examples and embodiments described herein are for illustrative purposes only and that various modifications or changes in light thereof will be suggested to persons skilled in the art and are to be included within the spirit and purview of this application and scope of the appended claims, which follow.

What is claimed is:

1. A method comprising:

receiving, at a backend server system from a user device executing a first model, an indication of a potential crash of a vehicle, the indication being generated by the user device based on an analysis of sensor data using the first model;

responsive to the indication, transmitting, by the backend server system, a request for vehicle sensor data to a third-party server system;

receiving, by the backend server system, the vehicle sensor data from the third-party server system, wherein the vehicle sensor data comprises point cloud data from a vehicle light detection and ranging (LIDAR) system or pixel data from a vehicle camera; and determining, by the backend server system using a second model, a severity of the potential crash based at least in part on the vehicle sensor data.

2. The method of claim 1, wherein the vehicle sensor data further comprises vehicle accelerometer data, a driver assistance system status, a vehicle speed, a detected point of impact on the vehicle, or vehicle acoustic sensor data.

3. The method of claim 1, wherein the second model is a physics-based model, wherein the vehicle sensor data comprises accelerometer data, and wherein determining the severity of the potential crash comprises executing the physics-based model using the accelerometer data.

4. The method of claim 1, wherein the vehicle sensor data is obtained from the vehicle by the third-party server system after the request is transmitted.

5. The method of claim 1, wherein the request specifies a time range for the vehicle sensor data, and wherein the vehicle sensor data consists of data generated within the time range.

6. A system comprising:
a processor; and
a memory storing instructions that, when executed by the processor, cause the system to:
receive, from a user device, crash event data for a vehicle, the crash event data comprising a time of a crash event and user device sensor data;
in response to receiving the crash event data, transmit a request for vehicle sensor data to a remote system, the vehicle sensor data corresponding to the vehicle, the request comprising a time range preceding the time of the crash event;
receive the vehicle sensor data from the remote system, wherein the vehicle sensor data comprises point cloud data from a vehicle light detection and ranging (LIDAR) system or pixel data from a vehicle camera;
provide the crash event data and the vehicle sensor data as input to a model; and
determine, using the model, a severity of the crash event.

7. The system of claim 6, wherein the vehicle sensor data consists of data generated during the time range.

8. The system of claim 6, wherein the memory stores additional instructions that cause the system to further:
receive additional input information that is different from the crash event data and the vehicle sensor data; and
input the additional input information into the model to determine the severity of the crash event.

9. The system of claim 8, wherein the additional input information comprises road network information corresponding to a location of the user device at the time of the crash event.

10. The system of claim 6, wherein the remote system is a third-party server system or the user device.

11. The system of claim 6, wherein the model comprises a machine learning model previously trained on historical vehicle sensor data and historical crash severity data.

12. The system of claim 6, wherein the memory stores additional instructions that cause the system to further:
based on the severity of the crash event, transmit a communication to the user device prompting a response;
receive the response from the user device; and
update the severity of the crash event based on the response.

13. The system of claim 6, wherein the memory stores additional instructions that cause the system to further initiate, based on the severity of the crash event, a vehicle tow process with a tow service.

14. The system of claim 6, wherein the vehicle sensor data further comprises vehicle accelerometer data, a driver assistance system status, a vehicle speed, a detected point of impact on the vehicle, or vehicle acoustic sensor data.

15. A user device, comprising:
a device sensor;
a processor; and
a memory storing instructions that, when executed by the processor, cause the user device to:
detect, using sensor data from the device sensor and a model, a crash event indicating a potential crash of a vehicle; and
in response to detecting the crash event, transmit an indication of the crash event and the sensor data to a backend server system, wherein the backend server system is configured to:
in response to receiving the indication and the sensor data, transmit a request for vehicle sensor data to a third-party server, the vehicle sensor data corresponding to the vehicle, and the request comprising a time range preceding a time of the crash event;
receive the vehicle sensor data associated with the time range from the third-party server, wherein the vehicle sensor data comprises point cloud data from a vehicle light detection and ranging (LIDAR) system or pixel data from a vehicle camera; and
determine, based on the sensor data from the device sensor and the vehicle sensor data, a severity of the crash event.

16. The user device of claim 15, wherein the memory stores additional instructions that, when executed by the processor, cause the user device to further:
determine, using the vehicle sensor data and a second model, a preliminary severity of the potential crash prior to transmitting the sensor data to the backend server system; and
based on the preliminary severity, selecting a portion of the sensor data to transmit to the backend server system.

17. The user device of claim 15, wherein the memory stores additional instructions that, when executed by the processor, cause the user device to further:
obtain additional sensor data from the device sensor for a second time range after the time of the potential crash; and
determining, using the additional sensor data, a validity of the potential crash prior to transmitting the indication to the backend server system.

18. The user device of claim 17, wherein the memory stores additional instructions that, when executed by the processor, cause the user device to further transmit, based on the validity of the potential crash, the additional sensor data to the backend server system.

19. The user device of claim 15, wherein detecting the potential crash comprises:
determining a portion of the sensor data generated during a second time range preceding the time of the potential crash; and
inputting the portion of the sensor data into the model to generate a crash event detection.

20. The user device of claim 15, wherein the third-party server is associated with a manufacturer of the vehicle, the vehicle sensor data is acquired from one or more sensors that are attached to the vehicle and external to the user device, and the user device is associated with an individual inside the vehicle during the crash event.

* * * * *